(12) United States Patent
Sorkin

(10) Patent No.: US 6,834,890 B2
(45) Date of Patent: Dec. 28, 2004

(54) COUPLER APPARATUS FOR USE WITH A TENDON-RECEIVING DUCT IN A SEGMENTAL PRECAST CONCRETE STRUCTURE

(76) Inventor: Felix L. Sorkin, 13022 Trinity Dr., Stafford, TX (US) 77477

( * ) Notice: Subject to any disclaimer, the term of this patent is extended or adjusted under 35 U.S.C. 154(b) by 0 days.

(21) Appl. No.: 10/640,761

(22) Filed: Aug. 15, 2003

(65) Prior Publication Data

US 2004/0056483 A1 Mar. 25, 2004

Related U.S. Application Data

(63) Continuation-in-part of application No. 10/139,798, filed on May 7, 2002.

(51) Int. Cl.[7] .............................................. F16L 49/00
(52) U.S. Cl. ...................... 285/230; 285/336; 52/223.13
(58) Field of Search ................................ 285/230, 374, 285/376, 370, 139.2, 139.3, 139.1, 336, 363; 52/223.13, 740.1, 223.14

(56) References Cited

U.S. PATENT DOCUMENTS

| | | | | |
|---|---|---|---|---|
| 463,890 A | * | 11/1891 | Cross ....................... 285/139.2 |
| 869,662 A | * | 10/1907 | Snyder ........................ 285/336 |
| 1,956,683 A | * | 5/1934 | Hewitt ..................... 285/139.2 |
| 3,142,499 A | * | 7/1964 | Lang ........................... 285/336 |
| 4,234,218 A | * | 11/1980 | Rogers ..................... 285/139.1 |
| 5,174,615 A | * | 12/1992 | Foster et al. ................. 285/363 |
| 5,231,931 A | | 8/1993 | Sauvageot |
| 5,704,656 A | * | 1/1998 | Rowe ....................... 285/139.3 |
| 6,209,929 B1 | * | 4/2001 | Ikegami et al. ........... 285/139.2 |
| 6,389,764 B1 | * | 5/2002 | Stubler et al. ............ 52/223.13 |
| 6,752,435 B1 | * | 6/2004 | Sorkin ........................ 285/336 |

\* cited by examiner

Primary Examiner—David Bochna
(74) Attorney, Agent, or Firm—Harrison & Egbert

(57) ABSTRACT

A coupler apparatus for use with tendon-receiving duct in a segmental precast concrete structure including a coupler body having an interior passageway for receiving the duct therein. The coupler body has a generally U-shaped channel formed at one end thereof. The coupler element has a connector element formed on interior thereof adjacent one end of the coupler body so as to allow the coupler element to receive a variety of implements for the formation of the precast concrete segment.

18 Claims, 13 Drawing Sheets

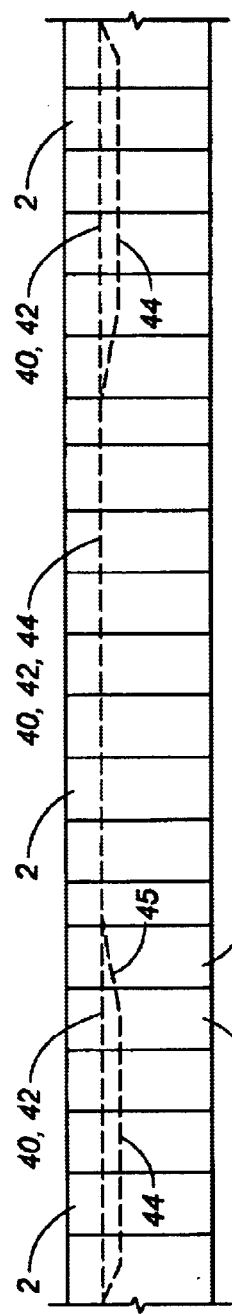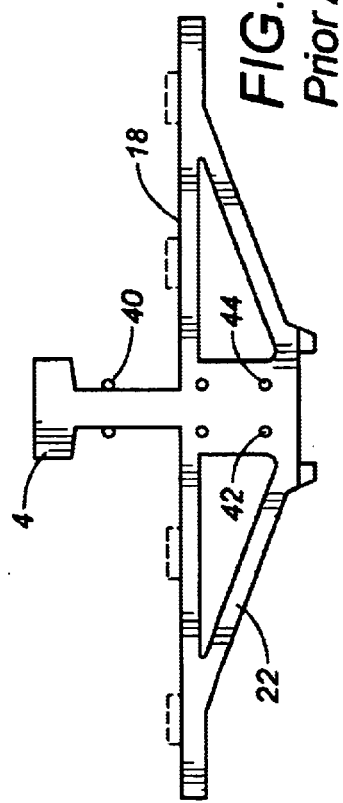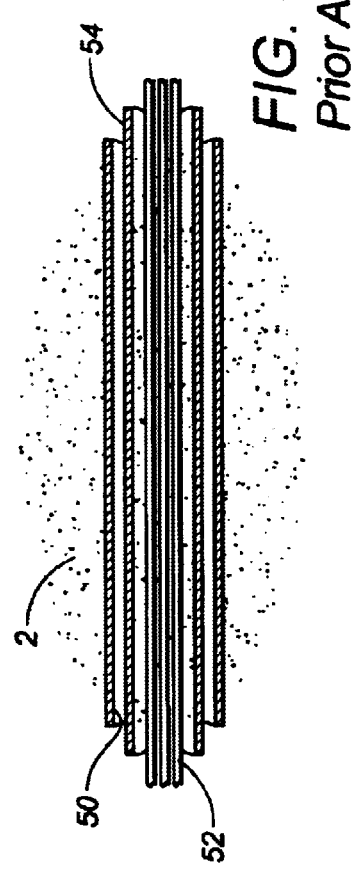

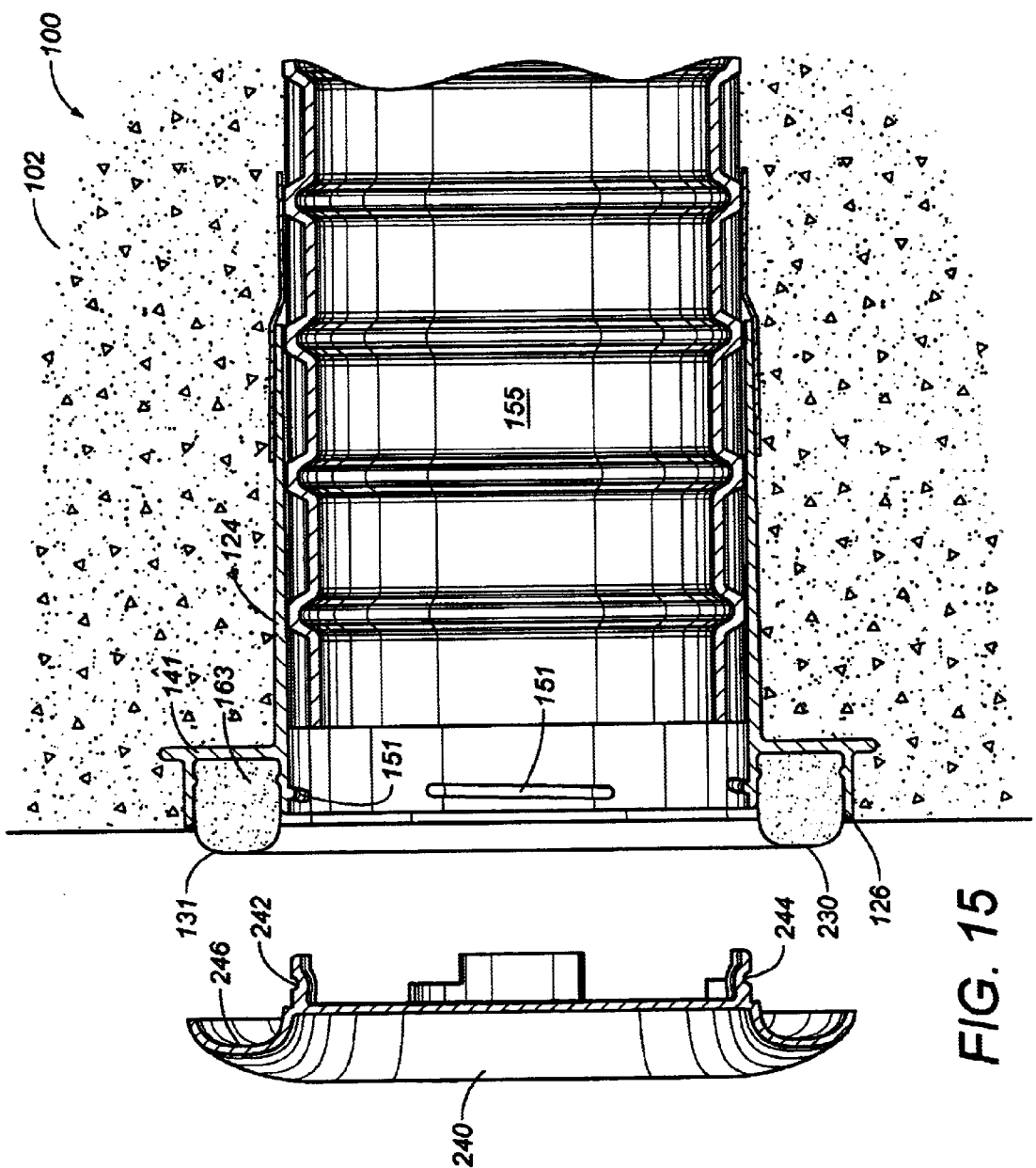

COUPLER APPARATUS FOR USE WITH A TENDON-RECEIVING DUCT IN A SEGMENTAL PRECAST CONCRETE STRUCTURE

RELATED U.S. APPLICATIONS

The present application is a continuation-in-part of U.S. patent application Ser. No. 10/139,798 filed on May 7, 2002, and entitled "Symmetrical Coupler Apparatus for Use with Precast Concrete Construction", presently pending.

STATEMENT REGARDING FEDERALLY SPONSORED RESEARCH OR DEVELOPMENT

Not applicable.

REFERENCE TO MICROFICHE APPENDIX

Not applicable.

1. Field of the Invention

The present invention relates to the assembly and installation of precast concrete segments used in construction activities, such as bridge and highway construction. More particularly, the present invention relates to couplers for joining the ends of interior ducts of such precast concrete segments in end-to-end liquid-tight relationship.

2. Description of the Prior Art

Precast segmental bridges are known and commonly used throughout the world as a means to forge roadways through mountainous terrain or across rivers or other barriers. Such bridges are typically constructed in accordance with the following sequence: First, a series of upright piers are formed along the bridge span. Thereafter, cantilevered bridge section are built out of each pier by successively mounting the precast segments to previously completed bridge components and post-tensioning the segments thereto. The cantilevered bridge sections are built out from each pier in a symmetrical fashion so that the piers are not subjected to undue bending loads. When the cantilevered sections are complete, the ends thereof are post-tensioned together to form a continuous bridge deck. Typically, two such bridge spans are constructed to accommodate the two directions of travel. These spans are generally side-by-side, but need not be parallel (horizontally or vertically) nor at the same elevation.

FIGS. 1–4 illustrate a form of such precast segmental bridge construction in accordance with the teachings of U.S. Pat. No. 5,231,936, issued on Aug. 3, 1993 to G. Sauvagiot. This form of segmental precast bridge construction is particularly disclosed as used with a rapid transit viaduct system.

Referring to FIG. 1, a rapid transit viaduct section two includes a central load bearing span or body member 4 supported by a pair of upright pier members 6 and 8. Extending laterally from opposite lower side portions of the central body 4 are a pair of lateral platform structures 10 and 12. Each of the platform structures 10 and 12 has a pair of rails 14 mounted thereon for carrying a rapid transit vehicle. In addition, each of the platform sections may be provided with an upright sidewall section 16 as required for safety, noise pollution and other considerations. One or more sets of rails 14 are carried by each of the lateral platform structures depending on the requirements of the transit systems.

The platform structures 10 and 12 each include respective upper platform decks and respective lower support struts 22 and 24. The lower support struts 22 and 24 are mounted as close to the bottom of the central load bearing body 4 as practicable. Deck members 18 and 20 are mounted to the central body 4 at an intermediate portion thereof above the support struts 22 and 24. The support struts angle upwardly from their point of attachment with the load bearing body 4 until they intersect the deck members. As such, the deck members 18 and 20 and support struts 22 and 24 form a box section providing resistance to torsional loading caused by track curvature and differential train loading. This box section may be considered a closed base. The load bearing body 4 bisects the closed base and extends vertically upwardly therefrom to provide span-wise bending resistance. Preferably, the entire duct section 2 is cast as a single reinforced concrete cross-section.

The platform sections 10 and 12 each include lower pier mounts 26 and 28. These are mounted respectively to the bottom of the support structures 22 and 24. The pier mounts 26 and 28 are, in turn, supported, respectively, on the piers 6 and 8 using a plurality of neoprene pads 30, which provide a cushioned support for the structure.

As shown in FIG. 1, the viaduct section 2 forms part of a viaduct system supporting rails 14 for carrying rapid transit vehicles 32 and 34. The viaduct section 2 may be formed as a precast modular segment. The viaduct section 2 is then combined with other viaduct sections to form a precast segmental structure. To facilitate such construction, the load bearing body 4 may be formed with interlock member 36, while the lateral platform structures 10 and 12 may be each formed with interlock members 38.

Referring to FIG. 2, a viaduct system is formed from a plurality of precast sections 2 formed as modular segments and combined as a precast segmental structure extending between sequentially positioned piers (not shown). The sections 2 are placed in longitudinally abutting relationship. To facilitate that construction, the sections are match cast so that the abutting end portions thereof fit one another in an intimate interlocking relationship. Each successive section is therefor cast against a previously cast adjacent section to assure interface continuity.

The connection between adjacent modular sections is further secured by way of the interlock members 36 and 38. On one end of each section 2, the interlock members 36 and 38 are formed as external keys. On the opposite end of each section 2, the interlock members are formed as an internal slot or notch, corresponding to the key members of the adjacent viaduct system. Match casting assures that corresponding keys and slots, as well as the remaining interface surfaces, properly fit one another.

As seen in FIG. 2, the sections 2 are bound together with one or more post-tensioning cables or tendons 40, 42 and 44. The number of cables used will depend on a number of factors such as cable thickness, span length and loading requirements. The tensioning cables are each routed along a predetermined path which varies in vertical or lateral position along the span of the segmental structure.

FIG. 3 illustrates, diagrammatically, the manner in which the post-tensioning cables 40, 42 and 44 extend through the concrete structure of the spans. As can be seen in FIG. 3, the post-tensioning cables are sometimes positioned within the concrete segment themselves, and at other times are positioned externally thereof.

It is important to note that multiple post-tension cables are often used as extending through ducts within the concrete structure. In FIG. 4, it can be seen that the sections 2 are formed with appropriate guide ducts 50 at locations where the post-tensioning cables passed through the structure. The post-tensioning cable identified collectively by reference numeral 52 in FIG. 4, are routed through the guide ducts 50. To facilitate this routing, a continuous flexible conduit 54 is initially inserted through the guide ducts, and the post-tensioning cables 52 are thereafter placed in the conduit. The conduit 54 may advantageously be formed from polyethylene pipe but could also be formed from flexible metallic materials. The post-tensioning cables 52 are tensioned using conventional post-tensioning apparatus and the interior of the conduit 54 is cement grouted along the entire length thereof for corrosion protection.

One form of duct that is commercially available is shown in FIG. 5. The corrugated polymeric duct 56 is of a type presently manufactured by General Technologies, Inc. of Stafford, Tex., licensee of the present inventor. As can be see in FIG. 5, duct 56 has a plurality of corrugations 58 extending radially outwardly from the generally tubular body 60. The duct 56 has ends 62 and 64 through which post-tensioning cables can emerge. In FIG. 5, it can be seen that there are longitudinal channels 66, 68 and 70 extending along the outer surface of the tubular body 60. The longitudinal channels 66, 68 and 70 allow any grout that is introduced into the interior of the duct 56 to flow easily and fully through the interior of the duct 56. The longitudinal channels 66, 68 and 70 also add structural integrity to the length of the duct 56. It is important to realize that the duct 56 can be formed of a suitable length so as to extend fully through one of the segments 2 as used in a precast segmental structure.

Unfortunately, when such ducts, such as duct 56, are used in such precast segmental construction, it is difficult to seal the ends 62 and 64 of each duct to the corresponding duct of an adjacent section of the segmental structure. Conventionally, the segments are joined together in end-to-end relationship through the application of an epoxy material to the matching surfaces of the structure. Under such circumstances, it is very common for the epoxy to flow or to become extruded into the opening at the ends 62 and 64 of the duct when the segments are connected in end-to-end relationship. In other circumstances, a grout is pumped through the interior passageway of the duct 56 so as to offer a seal against the intrusion of air and water into the interior of the duct 56. The grout is pumped through the interior of the ducts. Unfortunately, if there is an incomplete connection between the duct 56 and the duct of an adjoining segment of the segmental structure, then the epoxy will leak out into the interface area between the segments and will not flow fully through the entire duct assembly. Once again, an incomplete grouting of the interior of the duct 56 may occur.

It is important to note that in such precast concrete segmental construction, the concrete will slightly warp when matched with the adjoining section. Even though match casting is employed, the lack of homogeneity in the concrete mixtures used for the adjoining sections can cause a misalignment between matching sections. A great deal of tolerance must maintained when a coupler is developed so that any warping or distortion in the surfaces of the matching segments can be accommodated.

The ability to avoid air and liquid intrusion into the interior of the duct 56 is very important in such multi-strand, precast concrete segmental structures. As can be seen in FIG. 1, since the structure is often used on bridges or elevated structures, the post-tensioning cables can be subject to a great deal of exposure from the elements. For example, if the bridge structure is associated with roads traveled by motor vehicles, then there is often the application of salt onto the highway. This salt, when dissolved in water, can leach through the area between the structure segments into the ducts and deteriorate the post-tensioning cables over time. As the post-tensioning cables become corroded, over time, they can weaken so as to potentially cause the failure of the segmental structure. Past experience with such structures has shown that the primary area of leakage would be through those crack formed between those matched segments. As such, it is particularly important to provide a coupler for use in association with the plastic ducts which will effectively prevent any liquid intrusion from entering the area interior of the ducts and adjacent to the post-tensioning cables.

It is an object of the present invention to provide a coupler apparatus which allows for the coupling of multi-tendon ducts in precast segmental concrete structures.

It is another object of the present invention to provide a coupler apparatus which automatically adjusts for any misalignments or warpage in the matching concrete segments.

It is another object of the present invention to provide a coupler apparatus which assures a seal between the coupler and the connected duct.

It is still a further object of the present invention to provide a coupler apparatus which is easy to install, easy to use and easy to manufacture.

It is still a further object of the present invention to provide a coupler apparatus which effectively prevents the intrusion of an epoxy into the interior of the duct during the sealing of one structural segment to another structural segment.

It is a further object of the present invention to provide a symmetrical duct coupler which facilitates the ability to manufacture and install the components thereof.

These and other objects of the present invention will become apparent from a reading of the attached specification and appended claims.

SUMMARY OF THE INVENTION

The present invention is a coupler apparatus for use with concrete segments that comprises a first duct having an end and an exterior surface, a first coupler member extending over and around the exterior surface of the duct and having an end opening adjacent to an end of the first duct, a second duct having an end and an exterior surface, a second coupler member extending over and around the exterior surface of the second duct and having an end opening adjacent to the end of the second duct, a first gasket received within the end of the first coupler member and a second gasket received within the end of the second coupler member. The first coupler member and the second coupler member are connected together such that the first gasket is in sealing contact with the second gasket.

In the present invention, a first external seal is affixed in generally liquid-tight relationship to an opposite end of the first coupler member and affixed to an exterior surface of the first duct. A second external seal is affixed in generally liquid-tight relationship to an opposite end of the second coupler member and affixed to an exterior surface of the second duct. The external seal is formed of a heat shrink material. The external seals are in compressive contact with the respective exterior surfaces of the coupler members and with the exterior surfaces of the respective ducts.

In the present invention, an end of the first coupler member has a generally U-shaped channel facing the second coupler member. The second coupler member also has a generally U-shaped channel facing the first coupler member.

The first gasket is fitted within the channel of the first coupler member. The second gasket is fitted into the channel of the second coupler member. Each of the first and second coupler members has a flange element extending radially outwardly therefrom. This flange element is positioned inwardly away from the end of the respective coupler members. The first coupler member also a connector element extending around an interior of the coupler member adjacent to the end of the coupler member. This connector element is in the form of a protrusion extending inwardly from a wall around the interior passageway.

In the present invention, each of the gaskets is an elastomeric ring having a cross-sectional thickness greater than a depth of either of the respective channels of the first and second coupler members. The first duct, the second duct, the first coupler member and the second coupler member are each formed of a polymeric material. The first coupler member has an identical configuration to that of the second coupler member.

The present invention is also a coupler apparatus for use with a tendon-receiving duct in a segmental precast concrete structure. This coupler apparatus includes a coupler body having an interior passageway suitable for receiving the duct therein. The coupler body has a generally U-shaped channel formed at one end thereof. The coupler element has a connector element formed on an interior thereof adjacent one end of the coupler body. The coupler body also has a flange element extending radially outwardly therefrom and positioned inwardly away from one end of the coupler body.

In the coupler apparatus, a form plug can be removably received within the interior passageway of the coupler body so as to extend outwardly of this end of the coupler body. The form plug seals one end of the body over the interior passageway. In particular, the form plug has a groove extending therearound. This groove of the form plug engages the protrusion extending from the interior wall of the coupler body.

In the present invention, a blockout element is removably fitted within the U-shaped channel so as to close off an interior of the channel. Additionally, a match cast plug is removably received within one end of the coupler body. This match cast plug has a protrusion extending outwardly of one end of the coupler body. The match cast plug has a groove extending therearound. This groove engages the protrusion formed on the interior wall of the coupler body. The match cast plug also has a shoulder formed centrally on an exterior surface thereof. This shoulder is an abutment with one end of the coupler body.

In the present invention, a gasket is received within the U-shaped channel of the coupler body. This gasket is an elastomeric ring having a cross-sectional thickness greater than a depth of the U-shaped channel. An external seal is in compressive contact with an opposite end of the coupler body. This external seal has a portion extending outwardly beyond this opposite end of the coupler body. The external seal is of a heat shrink material. The external seal is sealed onto an external surface of the coupler body. A concrete segment surrounds an exterior surface of the coupler body. One end of the coupler body opens at a surface of the concrete segment.

Additionally, and furthermore, the coupler apparatus of the present invention can include a cap that is removably affixed over the gasket. This cap has an insert portion received within the interior passageway of the coupler body. The insert portion has a groove formed therearound. The protrusion formed on the interior wall of the coupler body engages the groove on the cap so as to retain the cap in its desired position over the gasket during transport.

BRIEF DESCRIPTION OF THE SEVERAL VIEWS OF THE DRAWINGS

FIG. 2 is a partially diagrammatic view showing a cross-section indicating the assemblage of the concrete segments of the structure of FIG. 1 and showing, in particular, the alignment of the post-tensioning cables.

FIG. 3 is an end view of a precast concrete segment, and the associated post-tension cables, of the prior art structure if FIG. 1.

FIG. 4 is a diagrammatic cross-sectional view showing the prior art techniques for the routing of a cable through the duct associated with the concrete segment.

FIG. 15 is an exploded cross-sectional view showing the arrangement of a protective cap for fitting over the gasketed end of the coupler apparatus during transport.

DETAILED DESCRIPTION OF THE INVENTION

Figure 6:
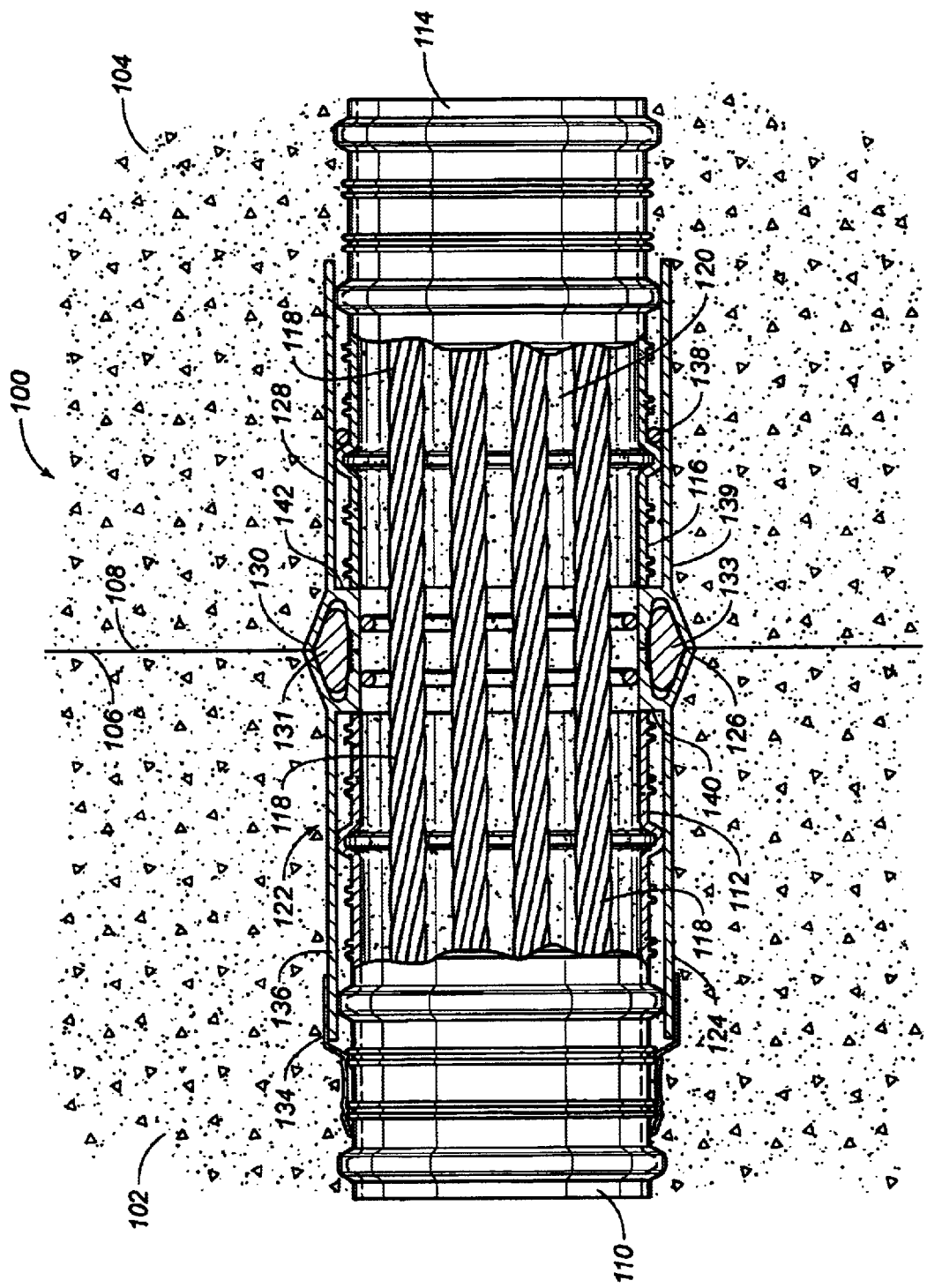
FIG. 6 is a cross-sectional view showing the coupler assembly as used in the precast concrete segmental structure of the present invention.

Referring to FIG. 6, there is shown at 100 the precast concrete segmental structure in accordance with the teachings of the present invention. The structure 100 includes a first concrete segment 102 and a second concrete segment 104. The first concrete segment 102 has a surface 106 which is joined in surface-to-surface contact with the surface 108 of the concrete segment 104. The segments 102 and 104 are formed by match casting, as described hereinbefore and as will be described hereinafter.

Figure 1:
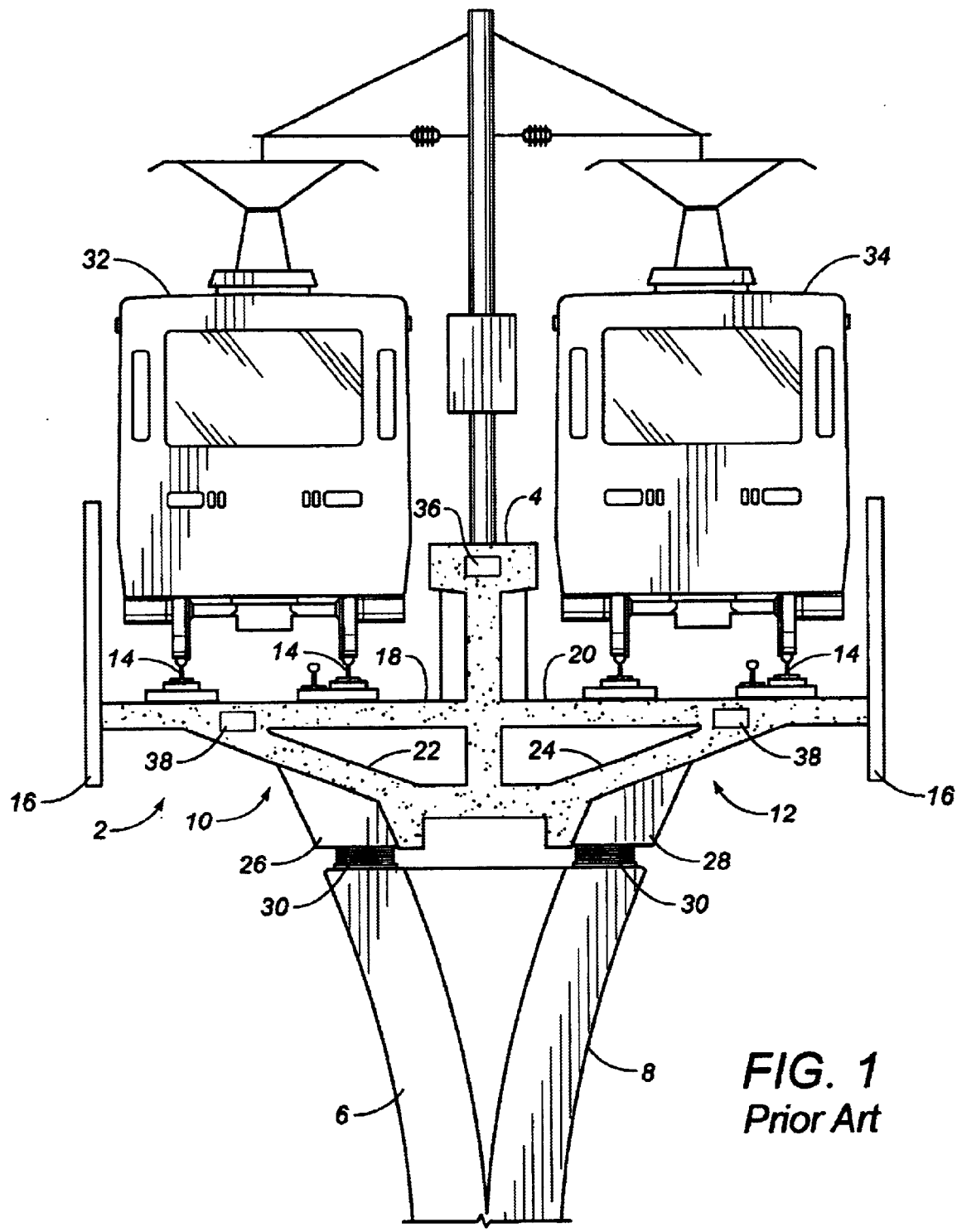
FIG. 1 is a diagrammatic view showing a cross-section of a rapid transit viaduct structure employing a prior art precast segmental structure.
Figure 5:
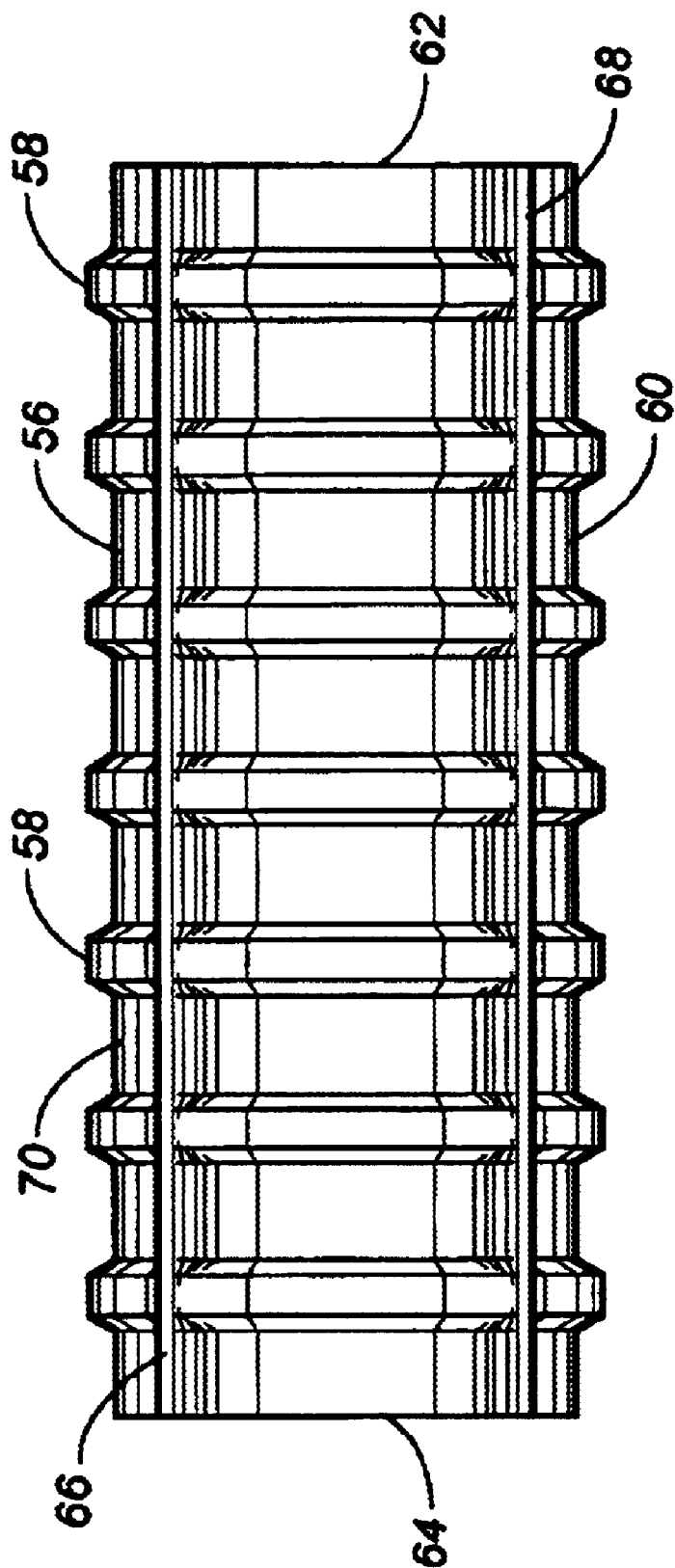
FIG. 5 is a side elevational view of a prior art multi-cable duct as used in the present invention.

Importantly, a first duct 110 is embedded in the first concrete structure 102. Duct 110 has a construction similar to that shown in FIG. 5, or similar to other multi-cable ducts. The first duct 110 has an end 112 generally adjacent to the surface 106 of the concrete segment 102. Similarly, a second duct 14 is embedded in the second concrete segment 104. The second duct 114 has a configuration similar to that of duct 110. Duct 114 has an end 116 generally adjacent to the surface 108 of concrete segment 104. Each of the ducts 110 and 114 are embedded in the respective concrete segments 102 and 104 so as to be generally longitudinally aligned. The duct 110 has an interior passageway which will be axially aligned with the interior passageway of duct 114.

A plurality of tendons will extend longitudinally through the interior passageways of the ducts 110 and 114. The tendons will be properly post-tensioned in a conventional manner and as described hereinbefore. A grouting material can be introduced through the interior passageways 110 and 114 to further cement and seal the interior of the ducts 110 and 114 around the tendons. The grouting material, in combination with the polymeric material of the ducts 110 and 114, serves to avoid the adverse effects of liquid intrusion into the tendons. The present invention utilizes a unique coupler apparatus 122 which further assures the avoidance of liquid intrusion through the space between the surface 106 of concrete segment 102 and the surface 108 of concrete segment 104. A first coupler member 124 extends over and around the exterior surface of the first duct 110. The first coupler member 124 has an end 126 opening at the surface 106 of concrete segment 102. Similarly, the end 126 of the coupler member 124 is generally forward of, but adjacent to, the end 112 of first duct 110. A second coupler member 128 extends over and around the exterior surface of the second duct 114. The second coupler member 128 has an end 130 opening at the surface 108 of concrete segment 104. End 130 is slightly forward of the end 116 of the duct 114. A first gasket 131 is received in the end 126 of the coupler member 124. A second gasket 133 is received within the end 130 of the coupler 128. The gaskets 131 and 133 are in compressive contact with each other so as to prevent liquid from passing between the ends 126 and 130 of the respective coupler members 124 and 128 into the interior of the ducts 110 and 114. The coupler members 124 and 128 have an identical configuration to each other. This serves to minimize the manufacturing requirements since only a single mold is required for each of the coupler members. Also, installation is simplified since unskilled workers can install the first and second coupler members without regard to the configuration of a particular coupler member.

An external seal 134 is affixed in generally liquid-tight relationship to an opposite end 136 of the first coupler member 124 and is also affixed to an exterior surface of the first duct 110. In particular, the external seal 134 is formed of an elastomeric sleeve or of an annular heat shrink material. The external seal 134 will be in compressive liquid-tight contact with the exterior surface of the first coupler member 124 and with the exterior surface of the duct 110. Prior to embedding the coupler member 124 into the concrete associated with the concrete segment 102, the coupler member 124 can be affixed in liquid-tight relationship by applying heat to the exterior surface of the external seal 134. The heat-shrink material of the external seal 134 will tightly engage the surfaces of the coupler member 124 and also the exterior surfaces of the duct 110. As a result, the exterior surface 134 will prevent liquid intrusion through the opposite end 136 of the coupler member 124.

Similarly, an external seal 138 in affixed in generally liquid-tight relationship to an opposite end 139 of the second coupler member 128 and also is affixed to an exterior surface of the second duct 114. In particular, this external seal 138 is also formed of an elastomeric sleeve or an annular heat shrink material, similar to that of external seal 134. The external seal 138 will be in compressive liquid-tight contact with the exterior surface of the second coupler member 128 and with the exterior surface of the duct 114. The external seal 138 is applied to the second coupler member 128 and to the second duct 114 in the same manner that the external seal 138 was applied over the first coupler member 124 and onto the first duct 110. As a result, the external seal 134 will prevent liquid intrusion through the opposite end 139 of the coupler member 128.

Figure 7:
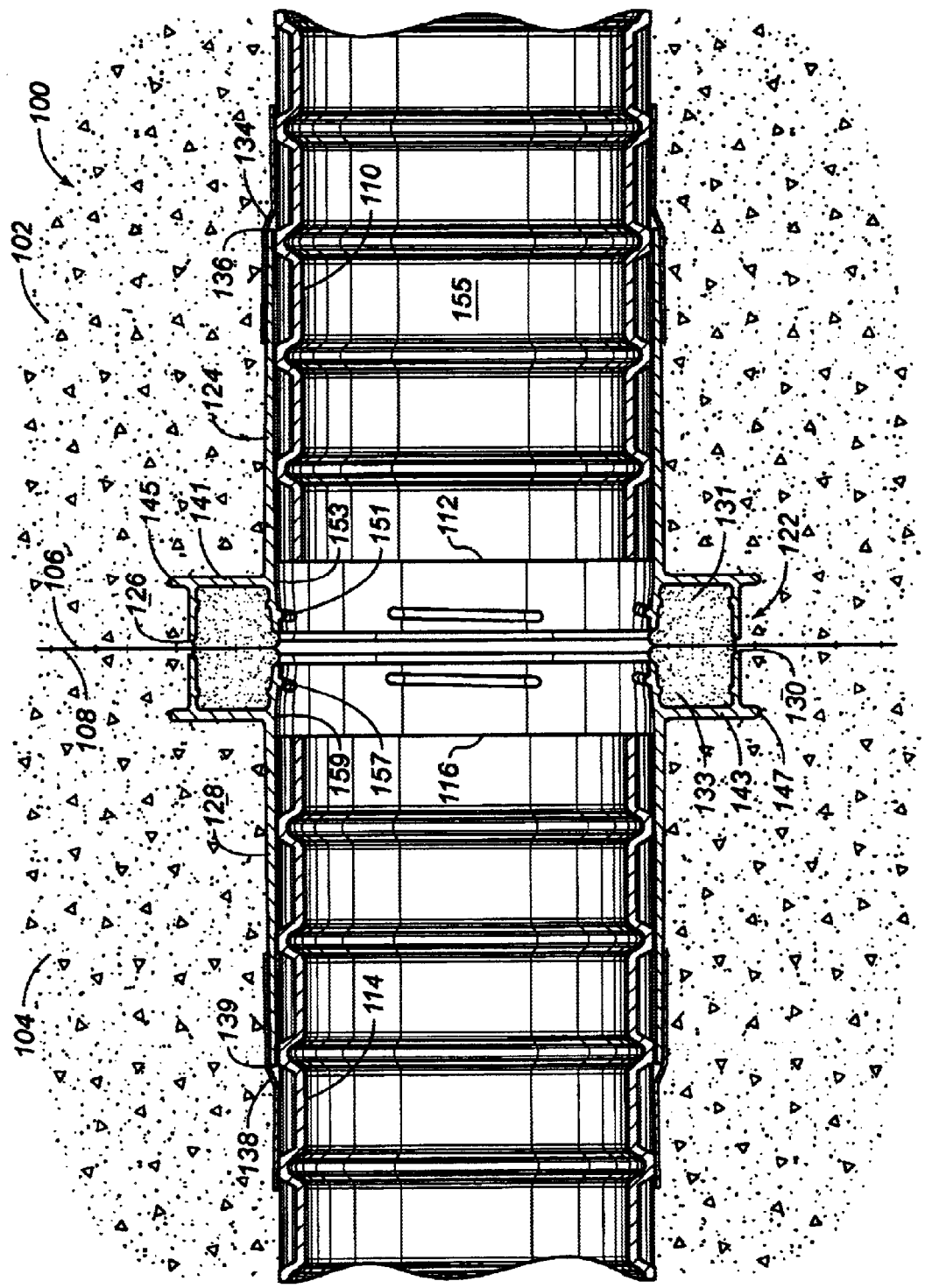
FIG. 7 is a cross-sectional view showing the assembly of the coupler apparatus of the present invention.

In FIG. 7, it can be seen that the end 126 of the first coupler member 124 has a generally U-shaped channel 141 facing the second coupler member 128. In particular, it is the opening of this U-shaped channel which faces the second coupler member 128. Similarly, the end 130 is also a U-shaped channel 143 which faces the U-shaped channel 141. It can be seen that the first gasket 131 is fitted within the opening of the U-shaped channel 141. Similarly, the second gasket 133 is fitted within the opening of the U-shaped channel 143. A flange element 145 extends radially outwardly from a side of the first U-shaped channel 141. Similarly, a flange element 147 extends radially outwardly from the U-shaped channel 143. The arrangement of these flange members 145 and 147 will further assure the accurate placement and retention of the ends 126 and 130 of the coupler members 124 and 128 within the respective concrete blocks 102 and 104.

The gaskets 131 and 133 are elastomeric rings having a cross-sectional thicknesses greater than a depth of either of the respective channels 131 and 133 at the ends 126 and 130 of the coupler members 124 and 128. As a result, the elastomeric rings of the gaskets 131 and 133 will effectively "fill" the entirety of the open areas of the channels 141 and 143. The configuration of the channels 141 and 143 causes the elastomeric material of the gaskets 131 and 133 to effectively cause a tight sealing relationship thereagainst.

In the present invention, a small protrusion 151 extends inwardly from an inner wall 153 of the first coupler member 124. The protrusion 151 will extend around the inner wall and around the interior passageway 155. Similarly, another small protrusion 157 extends inwardly from the inner wall 159 of the second coupler member 128. These protrusions 151 and 157 facilitate the ability to connect various items for the formation of the segmental blocks, as will be described hereinafter. Each of the small protrusions 151 and 157 can be considered the connecting elements associated with each of the coupler members 124 and 128.

Importantly, the present invention is of relatively low cost. The first duct 110, the second duct 114, the first coupler member 124 and the second coupler member 128 are formed of a polymeric material. Each of these components can be formed in an injection molding process. Similarly, the gaskets 131 and 133 can be formed of an elastomeric material or other resilient material. The material used for the gaskets 131 and 133 should be suitably hydrophobic so as to resist any liquid intrusion.

Figure 8:
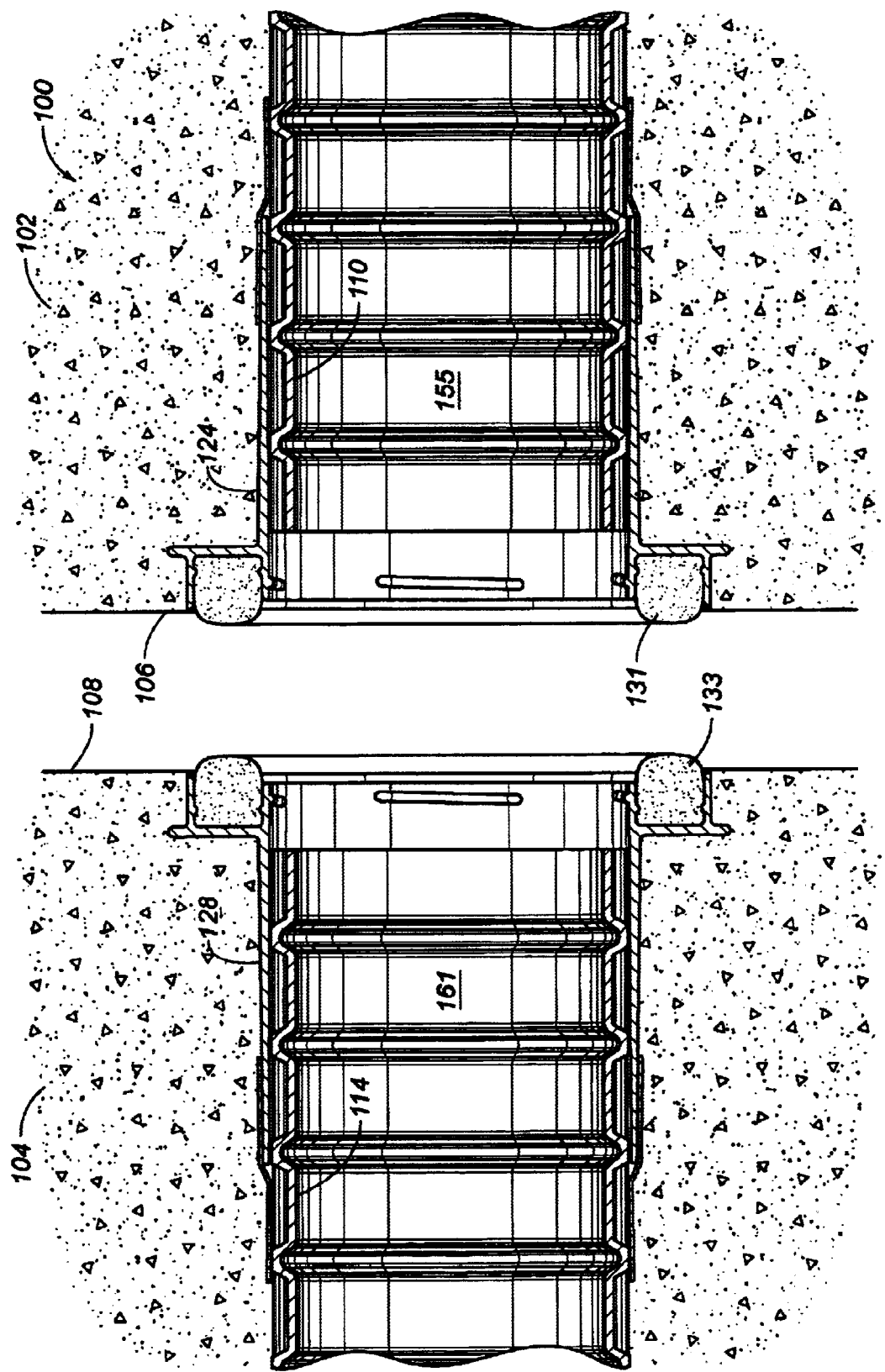
FIG. 8 is an exploded cross-sectional view showing the assembly of the coupler apparatus of the present invention.

FIG. 8 is an illustration of the apparatus 100 of the present invention prior to the installation of the tendons and the installation of the grout. In particular, FIG. 8 shows the initial assembly of the components of the present invention. As can be seen, the first coupler member 124 is axially aligned so that the interior passageway 155 thereof is aligned with the interior passageway 161 of the second coupler member 128. Alternatively, it can be considered that the interior passageway of the respective ducts 110 and 114 are aligned with each other. The surface 106 of concrete segment 102 faces the surface 108 of concrete segment 104. These segments 102 and 104 are brought together until the gaskets 131 and 133 establish a sealing contact with each other. Once joined together, the seals 131 and 133 will effect a seal so as to prevent liquid intrusion into the interior passageways 155 and 161. Tendons and grout can then be installed into the interior passageways 155 and 161 of the respective ducts 110 and 114.

Figure 9:
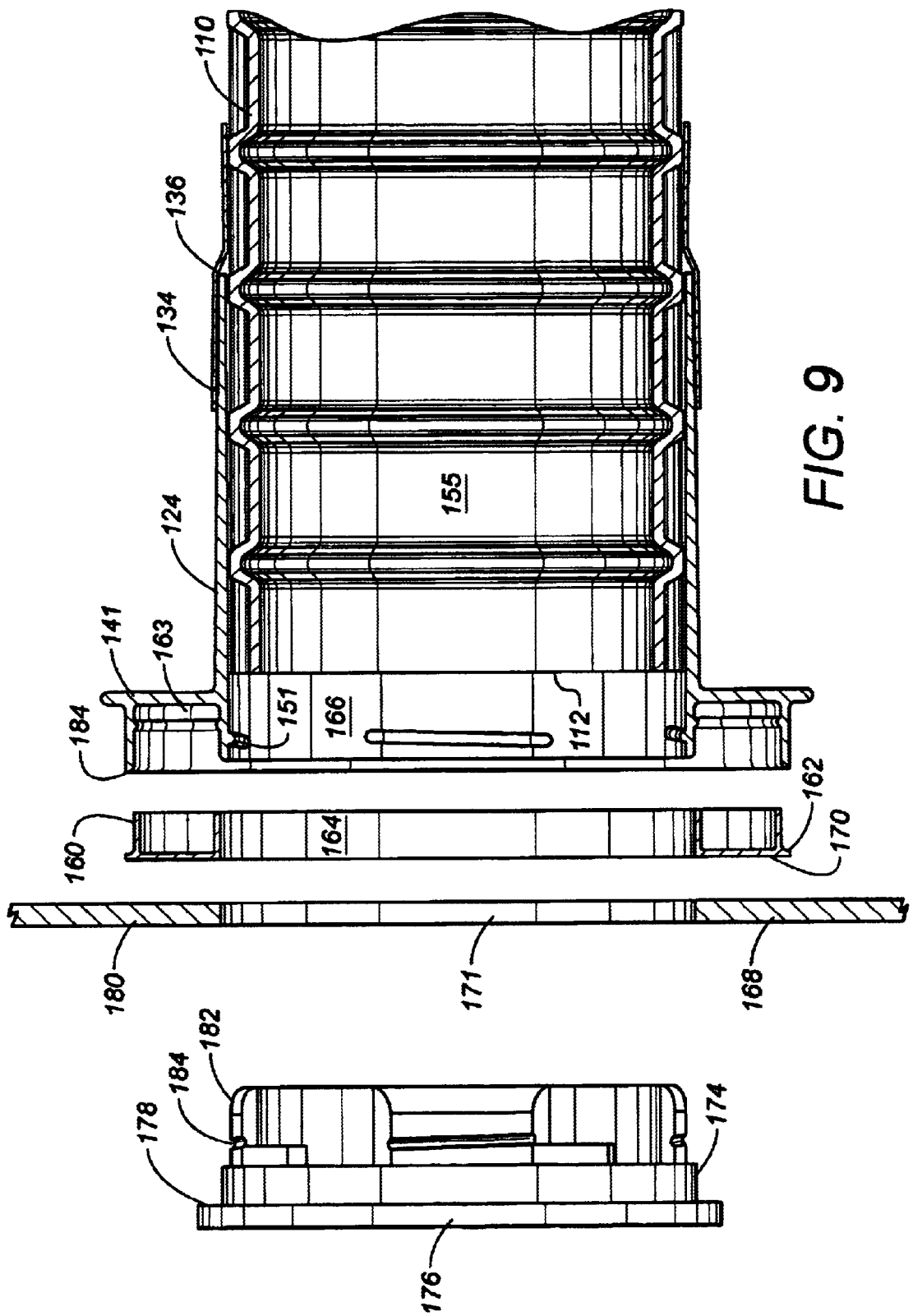
FIG. 9 is an exploded view of the initial arrangement of components of the coupler apparatus of the present invention during the formation of the concrete segment.

The present invention closely relates to the initial formation of the concrete segment. The initial steps in the formation of the concrete segment are illustrated in FIG. 9. As can be seen in FIG. 9, the coupler member 124 has U-shaped channel 141 extending at end 126 thereof. The opposite end 136 has been sealed with external seal 134 to the exterior surface of duct 110. The duct 110 is positioned on the interior of the first coupler member 124 such that the end 112 faces outwardly of the end 126 of coupler member 124.

Initially, a blockout element 160 is positioned into the interior 163 of channel 141. The blockout element 160 is removably fitted within the interior 163 so as to effectively close off the interior 163 of channel 141. The blockout element 160 will extend around the periphery of the end 126 by a small shoulder 162 formed around the periphery of the blockout element 160. The blockout element 160 is an annular element which has an interior opening 164 generally corresponding in size to the opening at the end 166 of the coupler member 124.

A form board 168 can be placed against the outer surface 170 of the blockout element 160. The form board 168 will have opening 171 formed therein. Opening 171 will correspond axially to the opening 164 of blockout element 160.

In order to secure the end 166 of the coupler member 124 against the form board 168 such that the blockout element 160 is interposed therebetween, a form plug 174 is inserted through the opening 171, the opening 164 and into the interior 155 of the coupler member 124. The form plug 174 has a cap portion 176 formed at one end thereof. The cap portion will have an inner surface 178 residing in surface-to-surface contact with the exterior surface 180 of form board 168. An insert portion 182 of the form plug 174 will pass through the opening 171 and through the opening 164 so as to reside within the interior 155 of the coupler member 124. A small groove 184 formed around the periphery of the insert portion 182 will be releasably engaged with the protrusion 151 formed on the inner wall of the coupler member 124. As such, the form plug 174 will retain the blockout element 160 and the coupler member 124 in their desired position relative to the form board 168.

Figure 10:
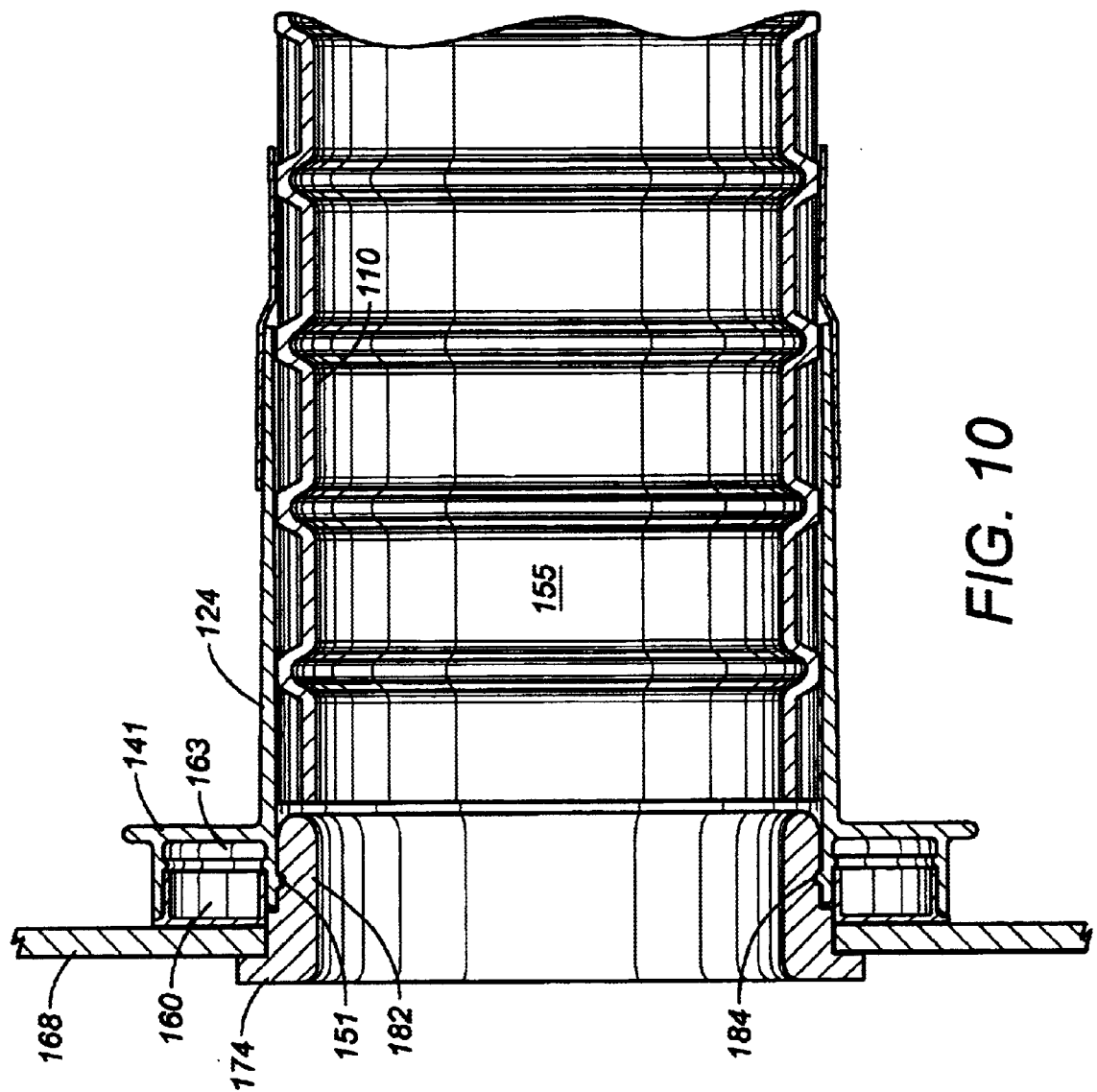
FIG. 10 is a cross-sectional view showing the coupler apparatus of the present invention as secured to a form board.

FIG. 10 shows the placement of the form plug 174 within the form board 168 such that the insert portion 182 engages the interior of the coupler member 124. As a result, the duct 110 is properly aligned with respect to the form board 168 and in a suitable so that the concrete can be poured thereover. It can be seen that the blockout element 160 is suitably positioned so as to cover the interior 163 of channel 141 and to be placed in surface-to-surface contact with an inner wall of the form board 168. FIG. 10 also shows that the groove 184 engages the protrusion 151 of the coupler member 124.

Figure 11:
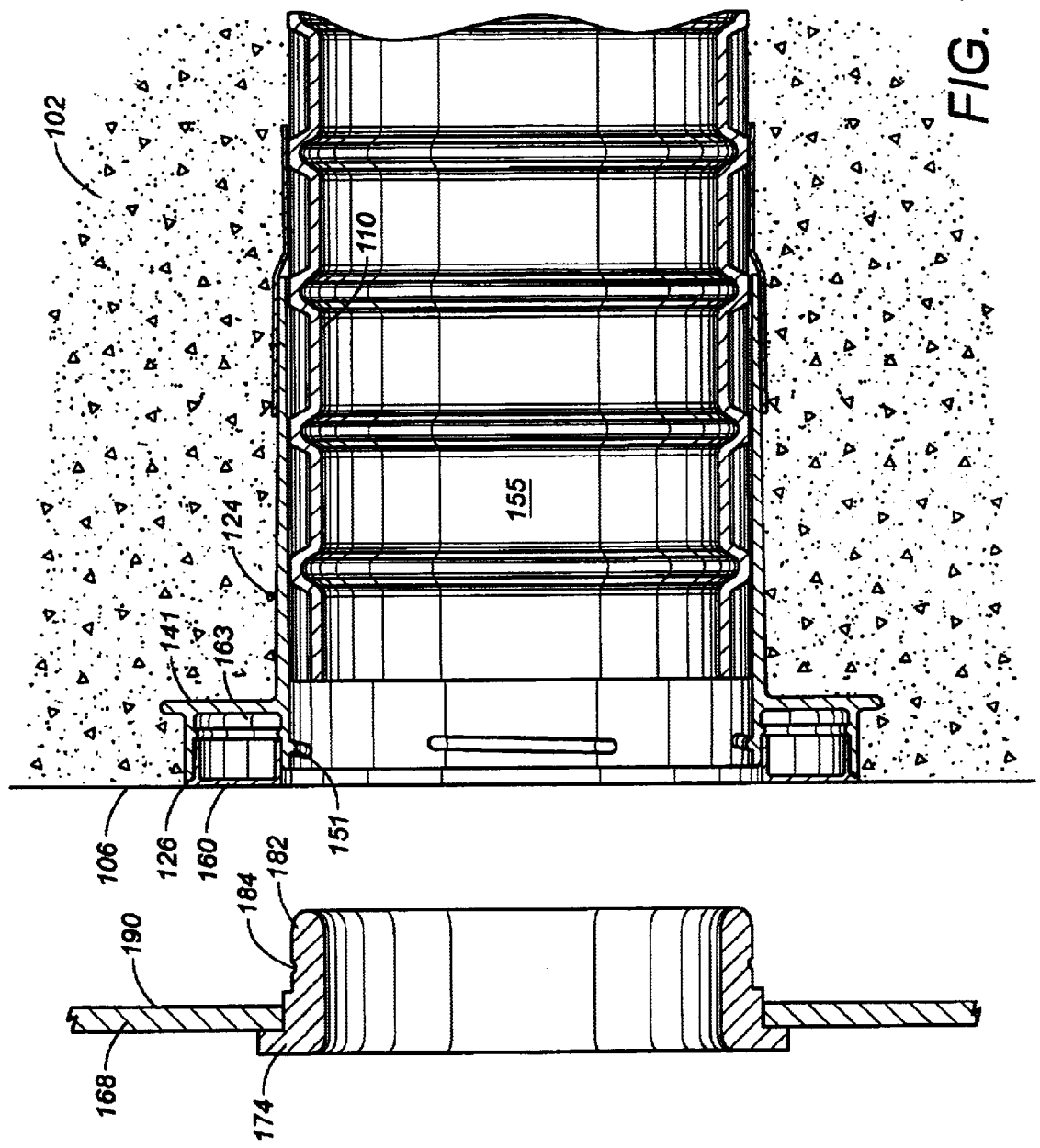
FIG. 11 is a cross-sectional of the coupler apparatus of the present invention as removed from the form board.

In FIG. 11, it can be seen that the concrete 102 has been poured around the coupler member 124 and the duct 110. The concrete 102 is suitably solidified against the inner wall 190 of the form board 168 so as to present flat surface 106 at the end of the concrete segment. The blockout element 160 will have a surface coplanar with the surface 106. Similarly, the end 126 of the coupler member 124 will be flush with surface 106. The form board 168, along with the form plug 174, can be suitably removed by separating the insert portion 182 such that the groove 184 separates from the protrusion 151 in an easy and convenient manner. After the form board 168 is removed, the segment is suitable for use in association with match casting.

Figure 12:
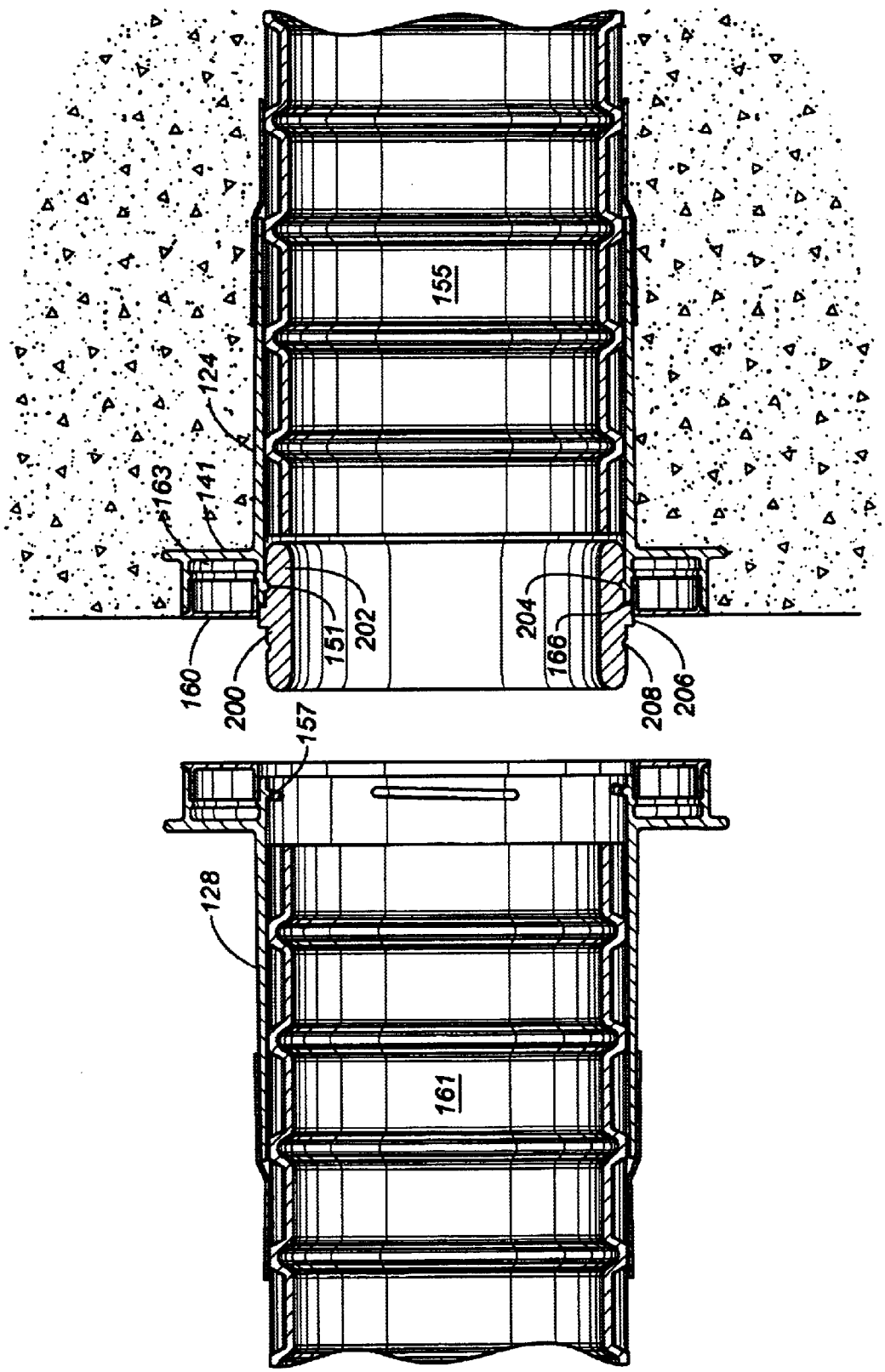
FIG. 12 is a cross-sectional showing the initial installation of an adjoining coupler apparatus for the match casting of an additional concrete segment.

FIG. 12 shows the next step in the process, which involves the insertion of a match cast plug 200 into the interior 155 of the coupling member 124. The blockout element 160 will remain in its position within the interior 163 of channel 141. The match cast plug 200 is an annular body of polymeric material and of generally symmetrical shape on each side of a center line thereof. Importantly, the match cast plug 200 has an insert portion 202 which can be placed into the interior of the coupling member 124. A small groove 204 is formed on the exterior surface of the match cast plug 200. Groove 204 can suitably detachably engage the protrusion 151 so as to retain the match cast plug 200 in a desired position. A shoulder 206 is formed on the outer periphery of the match cast plug 200. The end 166 of the coupler member 124 will be in abutment with the shoulder 206. As a result, the proper positioning of the match cast plug 200 is assured.

The second coupler member 128 is configured in a similar manner as that of the first coupler member 124. The second coupler member 128 has an interior passageway 161 therein. The interior passageway 161 will face the match cast plug 200 and be directed so as to be placed thereover. The second coupler member 128 also has a protrusion 157 which is suitable for placement within the groove 208 formed on the exterior surface of the match cast plug 200.

Figure 13:
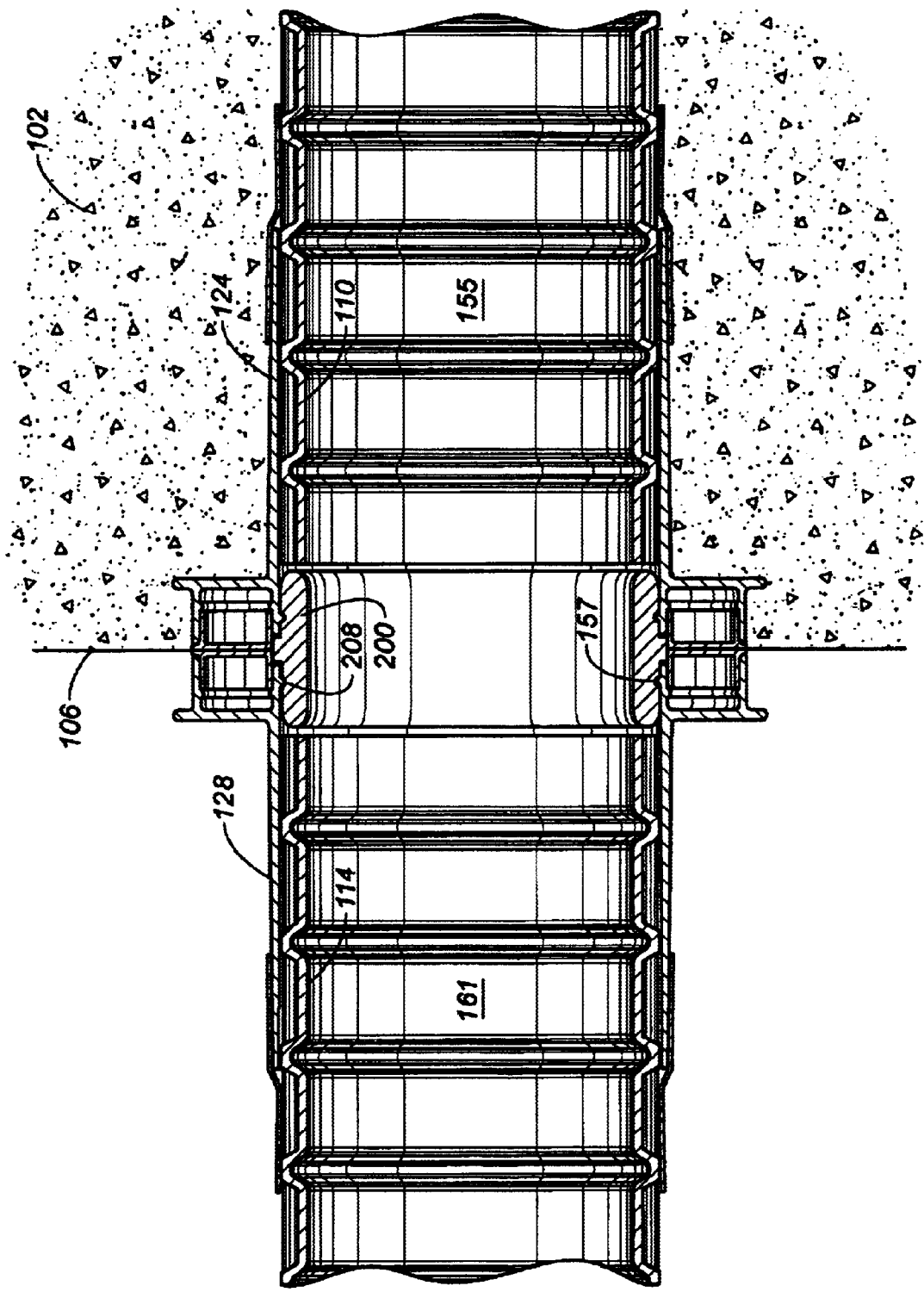
FIG. 13 is a cross-sectional view showing the coupler assembly of the present invention during the formation of the match cast segment.

FIG. 13 shows the placement of the second coupling member 128 against the surface 106 of the block 102 such that the end of the second coupler 128 is placed over another insertion portion of the match cast plug 200 and such that the groove 208 receives the protrusion 157 of the second coupler member 128. As a result, the proper and exact alignment of the second coupler member 128 with the first coupler member 124 is assured. Concrete can then be poured over the exterior surfaces of the second coupler member 128, along with the duct 114, so as to form the match cast segment thereover.

Figure 14:
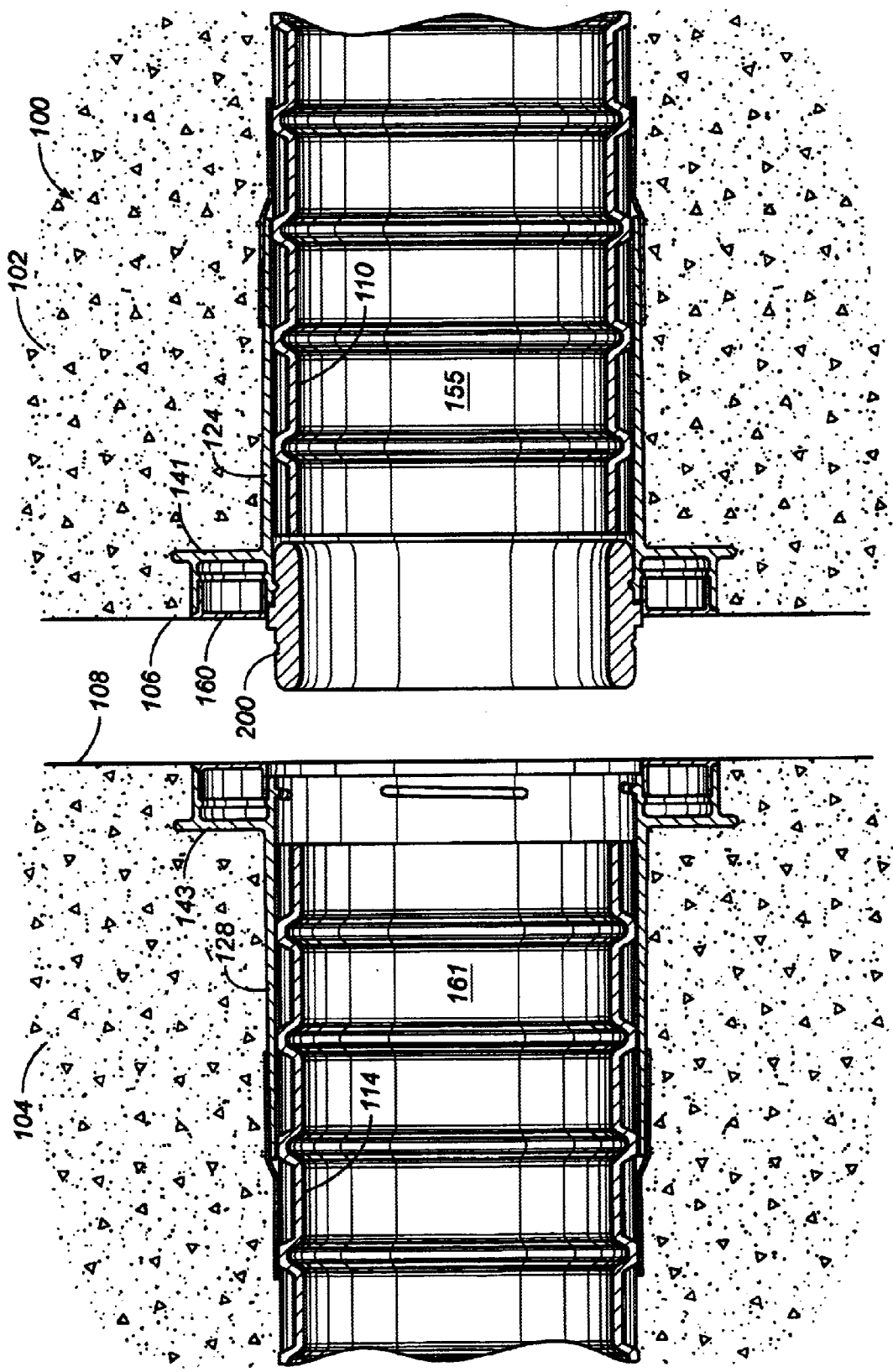
FIG. 14 is a cross-sectional view of the present invention showing the assembled segment as separated from the match casting.

FIG. 14 shows that the concrete segment 104 has been formed with flat surface 108. Flat surface 108 will match the flat surface 106 of the concrete segment 102. The segment 104 will then have a proper configuration whereby, during installation, the surfaces 106 and 108 will properly match so that the coupler members 124 and 128 will properly align during actual installation and post tensioning. After the segment 102 is separated from the segment 104, the blockout elements 160 and 220 can be removed from the respective channels 141 and 143. Similarly, the match cast plug 200 can be simply pulled from the opening at the end of the second coupler member 124. As a result, the separate segments 102 and 104 of coupler apparatus 100 will be ready for installation in the manner as shown in FIG. 6.

FIG. 15 shows that the gasket 131 has been installed within channel 141. It can be seen that the gasket 131 has a cross-sectional thickness which is greater than the depth of the interior 163 of the channel 141. As such, there is a surface 230 which extends outwardly beyond the end 126 of the coupling member 124.

So as to properly protect the gasket 131 and the end 126 of coupling member 121 during lifting and installation of the concrete 102, a cap 240 can be placed thereover. Cap 240 is formed of a rigid polymeric material and has an insert portion 242. Insert portion 242 includes a small groove 244 extending therearound. Groove 244 is suitably compatible with the notch so as to allow for the detachable receipt of the insert portion 242 within the interior 155 of the coupling member 144. The cap 240 also has a covering portion 246 which extends outwardly therefrom so as to cover the outer surface of the gasket 131. As a result of the installation of the cap 240 over the end 126 of the coupling member 124, the gasket 131 will be effectively protected during the lifting, moving and installation of the concrete segment 102 in the construction project. In the present invention, it can be seen that the small connection element 151 can be in the form of either a protrusion extending outwardly from the inner wall from the coupler member 124 or could be, in reverse, a small groove formed on the inner wall of the coupler member 124. In this alternative form, a protrusion would be formed on the insert portions on the various components used for the formation of the segmental coupling of the present invention. Additionally, the small connection element 151 facilitates the ability to properly position, install and retain the various components during the assembly process associated with the segmental construction. The connector element 151 works effectively without creating a barrier or a difficulty during the installation of the tendons within the interior of the duct. The protrusion can take various forms such as the angled orientation of the protrusion 151 as illustrated in FIG. 15.

In the present invention, the unique configuration of the gaskets 131 and 133, along with the channels 141 and 143, will avoid any intrusion of epoxy into the interior passageways 155 and 161. The gaskets 131 and 133 will block the extruded epoxy from flowing in an undesired manner into the interior passageways 155 and 161. In a similar manner, the gaskets 131 and 133 will also prevent any liquid intrusion from passing into these interior passageways. The compressive relationship between the gaskets 131 and 133 will establish a strong sealing bond between the coupler members 124 and 128 which will be resistive to the elements over an extended period of time. Subsequent to installation, the grout can be effectively pumped through the interior passageways 155 and 161 without any grout accidentally flowing outwardly of the ducts 110 and 114 in the area of the space between the segments 102 and 104. Secondary liquid intrusion is effectively prevented through the tight sealing relationship of the external seals 134 and 138.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A coupler apparatus for use with concrete segments comprising:
    a first duct having an end and an exterior surface;
    a first coupler member extending over and around said exterior surface of said duct, said first coupler member having an end opening adjacent said end of said first duct;
    a second duct having an end and an exterior surface;
    a second coupler member extending over and around said exterior surface of said second duct, said second coupler member having an end opening adjacent said end of said second duct;
    a first gasket received in said end of said first coupler member;
    a second gasket received in said end of said second coupler member, said first coupler member and said second coupler member being connected together such that said first gasket is in sealing contact with said second gasket;
    a first external seal affixed in generally liquid-tight relationship to an opposite end of said first coupler member and affixed to an exterior surface of said first duct; and
    a second external seal affixed in generally liquid-tight relationship to an opposite end of said second coupler member and affixed to an exterior surface of said second duct, each of said first and second external seals being formed of a heat shrink material, said first external seal being in compressive contact with an exterior surface of said first coupler member and with said exterior surface of said first duct, said second external seal being in compressive contact with an exterior surface of said second coupler member and with said exterior surface of said second duct.

2. The coupler apparatus of claim 1, said end of said first coupler member having a generally U-shaped channel facing said second coupler member, said second coupler member having a generally U-shaped channel facing said first coupler member, said first gasket fitted in the U-shaped channel of at least one of said first coupler member, said second gasket fitted in the U-shaped channel of at least one of said second coupler member.

3. The coupler apparatus of claim 1, said first coupler member having a flange element extending radially outwardly therefrom, said flange element positioned inwardly away from said end of said first coupler member.

4. The coupler apparatus of claim 1, each of said first and second gaskets being an elastomeric ring having a cross-sectional thickness greater than a depth of either of the respective U-shaped channels of said first and second coupler members.

5. The coupler apparatus of claim 1, said first coupler member having a connector element extending around an interior of said first coupler member adjacent said end of said first coupler member.

6. The coupler apparatus of claim 1, said first duct and said second duct and said first coupler member and said second coupler member each being formed of a polymeric material.

7. The coupler apparatus of claim 1, said first coupler member having an identical configuration as said second coupler member.

8. A coupler apparatus for use on tendon-receiving ducts of a segmental precast concrete structure comprising:
    a coupler body having an interior passageway suitable for receiving the duct therein, said coupler body having a generally U-shaped channel formed at one end thereof, said coupler element having a connector element formed on an interior thereof adjacent said one end of said coupler body; and
    a match cast plug removably received within said one end of said coupler body, said match cast plug having a portion extending outwardly of said one end of said coupler body, said match cast plug having a shoulder formed centrally on an exterior surface thereof, said shoulder being in abutment with said one end of said coupler body.

9. The coupler apparatus of claim 8, said coupler body having a flange element extending radially outwardly therefrom and positioned inwardly away from said one end of said coupler body.

10. The coupler apparatus of claim 8, further comprising:
    a form plug removably received within said interior passageway of said coupler body so as to extend outwardly of said one end of said coupler body, said form plug sealing said one end of said body over said interior passageway.

11. The coupler apparatus of claim 10, said connector element being a protrusion extending inwardly from a wall around said interior passageway, said form plug having a groove extending therearound, said groove of said form plug engaging said protrusion of said connector element.

12. The coupler apparatus of claim 8, further comprising:
a blockout element removably fitted within said U-shaped channel so as to close off an interior of said channel.

13. The coupler apparatus of claim 8, said connector element being a protrusion extending inwardly of a wall around said interior passageway, said match cast plug having a groove extending therearound, said groove of said match cast plug engaging said protrusion of said connector element.

14. The coupler apparatus of claim 8, further comprising:
a gasket received within said U-shaped channel of said coupler body.

15. The apparatus of claim 14, said gasket being an elastomeric ring having a cross-sectional thickness greater than a depth of said U-shaped channel.

16. The apparatus of claim 14, said connector element being a protrusion extending inwardly form a wall around said interior passageway, the coupler apparatus further comprising:

a cap removably affixed over said gasket, said cap having an insert portion received within said interior passageway at said one end, said insert portion having a groove formed therearound, said protrusion engaging said groove.

17. The apparatus of claim 8, further comprising:
a concrete segment surrounding an exterior surface of said coupler body, said one end of said coupler body opening at a surface of said concrete segment.

18. A coupler apparatus for use on tendon-receiving ducts of a segmental precast concrete structure comprising:

a coupler body having an interior passageway suitable for receiving the duct therein, said coupler body having a generally U-shaped channel formed at one end thereof, said coupler element having a connector element formed on an interior thereof adjacent said one end of said coupler body; and an external seal in compressive contact with an opposite end of said coupler body, said external seal having a portion extending outwardly beyond said opposite end, said external seal being of a heat shrink material, said external seal being sealed onto an exterior surface of said coupler body.

* * * * *